(12) United States Patent
Guerrero, Jr.

(10) Patent No.: US 11,222,757 B2
(45) Date of Patent: Jan. 11, 2022

(54) KEY SWITCH MECHANISMS, USER INPUT DEVICES AND METHODS OF FABRICATING A KEY SWITCH MECHANISM

(71) Applicant: RAZER (ASIA-PACIFIC) PTE. LTD., Singapore (SG)

(72) Inventor: Gil Palma Guerrero, Jr., Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/966,540

(22) PCT Filed: Feb. 1, 2018

(86) PCT No.: PCT/SG2018/050047
§ 371 (c)(1),
(2) Date: Jul. 31, 2020

(87) PCT Pub. No.: WO2019/151940
PCT Pub. Date: Aug. 8, 2019

(65) Prior Publication Data
US 2021/0050163 A1 Feb. 18, 2021

(51) Int. Cl.
*H01H 13/14* (2006.01)
*A63F 13/24* (2014.01)
(Continued)

(52) U.S. Cl.
CPC .............. *H01H 13/14* (2013.01); *A63F 13/24* (2014.09); *H01H 11/04* (2013.01);
(Continued)

(58) Field of Classification Search
CPC ...... H01H 3/125; H01H 13/705; H01H 13/14; H01H 13/70; H01H 13/704;
(Continued)

(56) References Cited

U.S. PATENT DOCUMENTS

| 4,177,367 A | 12/1979 | Tirone et al. |
| 4,316,066 A | 2/1982 | Muller et al. |

(Continued)

FOREIGN PATENT DOCUMENTS

| DE | 202006005500 U1 | 7/2006 |
| EP | 0133817 A2 | 3/1985 |

(Continued)

OTHER PUBLICATIONS

Atari Compendium, "Atari VCS/2600 Controllers", updated Nov. 12, 2017 in 190 pages at: (http://webcache.googleusercontent.com/search?q=cache:3g63PyS3LOsJ:www.ataricompendium.com/game_library/controllers/controllers.html+&cd=14&hl=en&ct=clnk&gl=uk).

(Continued)

*Primary Examiner* — Ahmed M Saeed
(74) *Attorney, Agent, or Firm* — Polsinelli PC (57) ABSTRACT

According to various embodiments, there is provided a key switch mechanism including: a key button; a plunger attached to the key button and displaceable between a neutral position and an activation position; an elastomeric dome which, when the plunger is in the neutral position, is non-deformed and which, when the plunger is in the activation position, is elastically deformed by the plunger; a conductive spring having a stationary end portion and a moveable end portion, the stationary end portion electrically coupled to a circuit, and the moveable end portion coupled to the elastomeric dome in a manner to be moved when the plunger is displaced towards the activation position, in connection with the corresponding deformation of the elastomeric dome; and an electrical contact electrically coupled to the circuit, wherein, when the plunger is in the neutral position, the electrical contact is arranged at a distance from the moveable end portion, and, when the plunger is in the (Continued)

activation position, the moveable end portion is moved to contact the electrical contact.

15 Claims, 5 Drawing Sheets (51) Int. Cl.
*H01H 11/04* (2006.01)
*H01H 13/02* (2006.01)

(52) U.S. Cl.
CPC ..... *H01H 13/023* (2013.01); *H01H 2215/002* (2013.01); *H01H 2215/006* (2013.01); *H01H 2215/03* (2013.01); *H01H 2231/008* (2013.01)

(58) Field of Classification Search
CPC ........... H01H 13/7065; H01H 13/7006; H01H 13/7057; H01H 13/78; H01H 13/79; H01H 13/52; H01H 13/703; H01H 13/507; H01H 13/83; H01H 2219/062; H01H 13/023; H01H 2219/036; H01H 2219/06; H01H 2219/064; H01H 9/161; H01H 2219/044; H01H 2219/066; H01H 13/04; H01H 9/182; H01H 2219/014
See application file for complete search history.

(56) References Cited

U.S. PATENT DOCUMENTS

| | | | |
|---|---|---|---|
| 4,480,937 A | | 11/1984 | Eckhardt |
| 4,482,932 A * | | 11/1984 | Hasegawa ............ H03K 17/975 361/288 |
| 4,817,950 A | | 4/1989 | Goo |
| 5,164,697 A | | 11/1992 | Kramer |
| 5,499,041 A | | 3/1996 | Brandenburg et al. |
| 6,102,802 A | | 8/2000 | Armstrong |
| 6,377,685 B1 | | 4/2002 | Krishnan |
| 6,409,600 B1 | | 6/2002 | Sobota et al. |
| 7,102,086 B2 | | 9/2006 | Bick et al. |
| 7,115,825 B2 | | 10/2006 | Aisenbrey |
| 7,450,106 B2 | | 11/2008 | Fyke |
| 7,964,810 B2 | | 6/2011 | Keist et al. |
| 8,410,383 B2 | | 4/2013 | Clark et al. |
| 9,614,521 B2 | | 4/2017 | Reise |
| 9,620,308 B1 | | 4/2017 | Li |
| 2002/0058549 A1 | | 5/2002 | Armstrong |
| 2003/0083131 A1 | | 5/2003 | Armstrong |
| 2004/0238340 A1 | | 12/2004 | Bick et al. |
| 2009/0103964 A1* | | 4/2009 | Takagi .................. H01H 3/125 400/495 |
| 2011/0148757 A1 | | 6/2011 | Lathrop et al. |
| 2013/0120258 A1 | | 5/2013 | Maus |
| 2017/0140883 A1 | | 5/2017 | Kitamura et al. |
| 2017/0221653 A1 | | 8/2017 | Liao et al. |
| 2017/0294276 A1* | | 10/2017 | Liu ......................... H01H 3/50 |
| 2017/0345589 A1* | | 11/2017 | Wu ....................... H01H 13/52 |

FOREIGN PATENT DOCUMENTS

| | | |
|---|---|---|
| EP | 0087369 B2 | 9/1989 |
| EP | 1696448 A1 | 8/2006 |
| GB | 2046996 A | 11/1980 |
| JP | 10-144173 A | 5/1998 |
| JP | 11-053976 A | 2/1999 |
| JP | 2002-025382 A | 1/2002 |
| WO | WO 2001/041171 A1 | 6/2001 |
| WO | WO 2001/045123 A1 | 6/2001 |
| WO | WO 2008/060936 A2 | 5/2008 |
| WO | WO 2011/094882 A1 | 8/2011 |
| WO | WO 2016/19101 | 12/2016 |

OTHER PUBLICATIONS

Sweet, Tim, "Switches and Encoders in the IoT Age", Appliance Design; Troy vol. 63, Iss. 9, Sep. 2015, ProQuest Technology Collection in 1 page.
"Rubber keypads come customized", Electonics Times, CMP Information Ltd. (London, UK), May 22, 2000, ProQuest Technology Collection in 1 page.
International Search Report and Written Opinion, dated Oct. 29, 2018, for the corresponding International Application No. PCT/SG2018/050047 in 9 pages.

* cited by examiner

KEY SWITCH MECHANISMS, USER INPUT DEVICES AND METHODS OF FABRICATING A KEY SWITCH MECHANISM

TECHNICAL FIELD

Various embodiments relate to key switch mechanisms and user input devices.

BACKGROUND

User input devices are devices that allow users to provide information into computing devices, for interacting with applications running on the computing devices. The computing devices referred herein may be a broad category including personal computers, game consoles, mobile devices and simulators. User input devices may include mice, keyboards, game controllers and joysticks. These user input devices usually include at least one button that can be depressed to activate a function in an application running on a computing device in communication with the user input device. User input devices typically employ dome switches as the underlying actuation mechanism of the buttons. Dome switches offer the advantage of low cost of manufacturing, but professional garners and gaming enthusiasts may find dome switches to be too slow, in other words, too unresponsive, for gaming applications that require short reaction times. Dome switches tend to be slow in activating electrical connection, due to the need to fully collapse the dome to make electrical contact and due to the relatively low electrical connectivity of carbon which is used as the electrical conductor in the dome switches. Also, users may find the experience of using of dome switches to be unsatisfying as dome switches do not provide audible feedback to indicate actuation of the switch.

SUMMARY

According to various embodiments, there may be provided a key switch mechanism including: a key button; a plunger attached to the key button and displaceable between a neutral position and an activation position; an elastomeric dome which, when the plunger is in the neutral position, is non-deformed and which, when the plunger is in the activation position, is elastically deformed by the plunger; a conductive spring having a stationary end portion and a moveable end portion, the stationary end portion electrically coupled to a circuit, and the moveable end portion coupled to the elastomeric dome in a manner to be moved when the plunger is displaced towards the activation position, in connection with the corresponding deformation of the elastomeric dome; and an electrical contact electrically coupled to the circuit, wherein, when the plunger is in the neutral position, the electrical contact is arranged at a distance from the moveable end portion, and, when the plunger is in the activation position, the moveable end portion is moved to contact the electrical contact.

According to various embodiments, there may be provided a user input device including a key switch mechanism. The key switch mechanism may include a key button; a plunger attached to the key button and displaceable between a neutral position and an activation position; an elastomeric dome which, when the plunger is in the neutral position, is non-deformed and which, when the plunger is in the activation position, is elastically deformed by the plunger; a conductive spring having a stationary end portion and a moveable end portion, the stationary end portion electrically coupled to a circuit, and the moveable end portion coupled to the elastomeric dome in a manner to be moved when the plunger is displaced towards the activation position, in connection with the corresponding deformation of the elastomeric dome; and an electrical contact electrically coupled to the circuit, wherein, when the plunger is in the neutral position, the electrical contact is arranged at a distance from the moveable end portion, and, when the plunger is in the activation position, the moveable end portion is moved to contact the electrical contact.

According to various embodiments, there may be provided a method of fabricating a key switch mechanism, the method including: attaching a key button to a plunger displaceable between a neutral position and an activation position; providing an elastomeric dome which, when the plunger is in the neutral position, is non-deformed and which, when the plunger is in the activation position, is elastically deformed by the plunger; electrically coupling a stationary end portion of a conductive spring to a circuit; coupling a moveable end portion of the conductive spring to the elastomeric dome in a manner to be moved when the plunger is displaced towards the activation position, in connection with the corresponding deformation of the elastomeric dome; arranging an electrical contact such that when the plunger is in the neutral position, the electrical contact is at a distance from the moveable end portion, and, when the plunger is in the activation position, the moveable end portion is moved to contact the electrical contact; and electrically coupling the electrical contact to the circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the key switch mechanisms or the user input devices are analogously valid for the respective methods, and vice versa. Furthermore, it will be understood that the embodiments described below may be combined, for example, a part of one embodiment may be combined with a part of another embodiment.

It will be understood that any property described herein for a specific key switch mechanism or a specific user input device may also hold for any key switch mechanism or any user input device described herein. It will be understood that any property described herein for a specific method may also hold for any method described herein. Furthermore, it will be understood that for any key switch mechanism or user input device or method described herein, not necessarily all the components or steps described must be enclosed in the key switch mechanism or user input device or method, but only some (but not all) components or steps may be enclosed.

In this context, the user input device as described in this description may include a memory which is for example used in the processing carried out in the user input device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices form part of the common general knowledge in Australia (or any other country).

In order that the invention may be readily understood and put into practical effect, various embodiments will now be described by way of examples and not limitations, and with reference to the figures.

Conventional dome switches do not provide the desired feedback to garners during intense game play, as they tend to bottom out or fade away and "stick" over time. In comparison, mechanical switches are generally responsive and "clicky", i.e. provide a rebound tactile feedback and audible feedback which provide a better user experience. However, mechanical switches may provide very short travel distance and actuation time which may cause the users to accidentally activate the switch.

A key switch mechanism according to various embodiments, may achieve fast response time similar to a mechanical switch while providing a longer travel distance. Also, the key switch mechanism may provide a satisfying tactile feel to a user when the key switch is actuated, with a faster return of the key. The key switch mechanism may further provide an audible feedback, for example a "click" sound, to the user, when the key switch is actuated. The key switch mechanism may use copper instead of carbon, for the electrical contacts. The electrical conductivity of copper is about $5.85 \times 10^7$ Siemens/m as compared to that of carbon which is about $5.9 \times 10^6$ Siemens/m. Also, the key switch mechanism may establish electrical contact; in other words, activate the switch, on halfway of the travel of the key button, instead of making contact only at full travel of the key button. The key switch mechanism includes a conductive spring coupled to a dome. The conductive spring electrically couples to the electrical contact when the dome is only partially collapsed, i.e. at halfway travel of the key button. The combination of the high electrical conductivity of the electrical contacts and the ability to establish electrical contact on halfway travel of the key button allows the key switch mechanism to be fast and responsive. The dome may collapse when the key is pressed. The collapsing of the dome may provide a satisfying tactile feel to the user. In addition, the dome may also provide a longer travel distance as compared to a mechanical switch, so that the chances of the user accidentally activating the switch are reduced. The key switch mechanism may also include an actuator spring for making the click sound similar to the audible feedback of mechanical switches. When the key button is depressed, the actuator spring may be compressed. The actuator spring may rebound within split seconds and may impact an internal surface of the key switch mechanism, to produce the click sound. When the actuator spring rebounds and impact the internal surface, the impact may also provide an added tactile feedback or "clicky" feel to the user. The actuator spring, the conductive spring and the electrical contact may be external to the dome, in other words, arranged outside of the dome. When the user releases his finger from the key, the dome may revert to its undeformed state owing to the elasticity of the dome material. In reverting to its undeformed state, the dome may push the key back to its original position. In addition, when the conductive spring and the actuator spring rebound, they may also push the plunger back to the original position, thereby reducing the stress accumulation over time on the dome. As such, the common problem of the dome sticking over time as in conventional dome switches, i.e. losing its resiliency to return to the undeformed state, may be avoided. Further, the combined forces of the dome, the contact spring and the actuator spring pushing the plunger back to its original position may result in a quick return of the key. As a result, the key may feel "bouncy" or sturdy to the user, thereby improving the tactile feel of the key.

Figure 1:
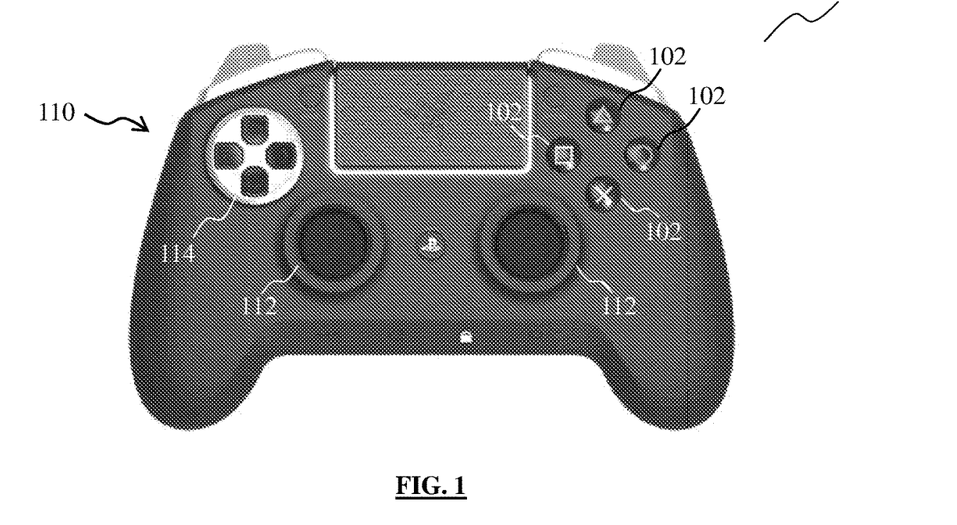
FIG. 1 shows an example of a user input device according to various embodiments.

FIG. 1 shows an example of a user input device 100 according to various embodiments. The user input device 100 may be a game controller. The game controller may be used to provide control inputs to a gaming application running on a computing device communicatively coupled to the game controller. The coupling may be provided by a wired connection such as a Universal Serial Bus cable, or a wireless connection such as WiFi or Bluetooth. The computing device may be for example, a personal computer, a video gaming console such as the Microsoft Xbox, the Sony PlayStation or the Nintendo Switch. The user input device may also be integrated as part of the computing device or may include the computing device within a housing of the user input device, for example, in the case of a mobile phone or a handheld gaming console.

The game controller may include a housing 110. The housing 110 may enclose the internal components of the game controller. The game controller may include a plurality of buttons 102 which may be referred to as the ABXY buttons. The game controller may also include at least one of a thumbpad 112 and a directional-pad 114. Each button 102 may include an underlying key switch mechanism 200. The key switch mechanism 200 may be one of the internal components of the game controller enclosed within the housing 110 such that it is not visible in FIG. 1. The button 102 may be depressible (in other words: pushed or activated) to actuate the underlying key switch mechanism. In other words, when the button 102 is depressed, the key switch mechanism may make an electrical connection, i.e. switches an electrical circuit, to generate an electrical signal.

Figure 2:
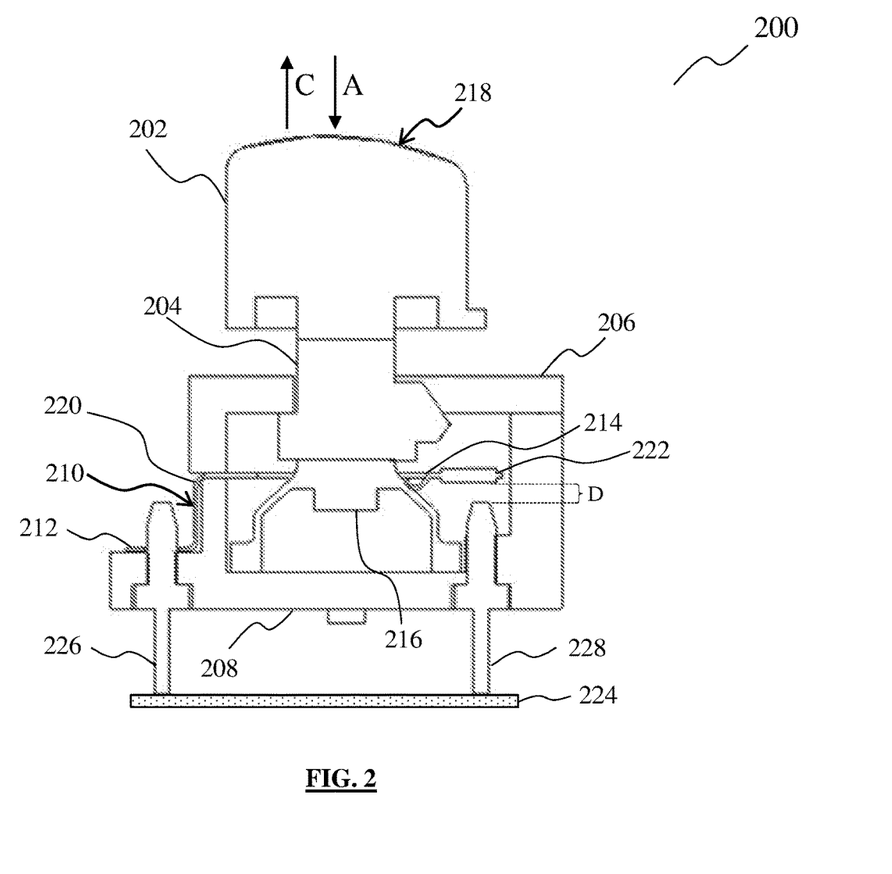
FIG. 2 shows a cross-sectional view of a key switch mechanism according to various embodiments.

FIG. 2 shows a cross-sectional view of a key switch mechanism 200 according to various embodiments. The key switch mechanism 200 may include a key button 202, a plunger 204, a dome 216, a conductive spring 210 and an electrical contact 228. The key button 202 may be, or may be part of, the button 102. The key button 202 may include a symbol, word, or drawing on a surface 218, as an identification of the function of the key button 202. The plunger 204 may be attached to the key button 202 such that when the key button 202 is pushed in direction A (i.e. downwards), the plunger 204 moves in the same direction together with the key button 202. The plunger 204 may be arranged adjacent to the dome 216, for example the plunger 204 may sit on the dome 216 and may be supported in a neutral position as shown in FIG. 2, by the elastomeric dome 216. The dome 216 may be elastomeric, in other words, fabricated out of an elastomer, such as rubber or silicone. The dome 216 may be elastic, in other words, springy and resilient. The dome 216 may be deformable or compressible when an external pressure is exerted on it. The dome 216 may revert to its original shape when the external pressure is removed. The dome 216 need not be rounded, or hemispherical in shape. The dome 216 may include a surface defining a cavity, such that the surface of the dome 216 may be collapsible into the cavity when an external pressure is exerted on the surface. The dome 216 may also be articulated, in other words, include articulations that allow the dome to be compressed. The dome 216 may at least partially deform or collapse, when the plunger 204 exerts a pressure on the dome 216. The conductive spring 210 may be a cantilever. The conductive spring may be fabricated from an electrically conductive and resilient material such as a metal. The metal may include for example, copper, iron, steel, gold, platinum, silver or palladium. The conductive spring 210 may include a stationary end portion 212 and a moveable end portion 214. The stationary end portion 212 may be anchored such that it may remain stationary even as the moveable end portion 214 moves. The stationary end portion 212 may be anchored to the bottom cover 208. The moveable end portion 214 may oppose the stationary end portion 212 and the moveable end portion 214 may be connected to the stationary end portion 212 via a hinge portion 220. The stationary end portion 212, the hinge portion 220 and the moveable end portion 214 may be integrally formed. The moveable end portion 214 may be moveable in a manner of being deflectable about the hinge portion 220. The moveable end portion 214 may include a contact pad 222. The contact pad 222 may also be an electrical conductor and may be shaped to have sufficient surface area to electrically couple with the electrical contact 228. The electrical contact 228 may be electrically coupled to a circuit 224. The electrical contact 228 may be a pillar inserted through an insulator, with two opposing ends extending out of the insulator. One end of the electrical contact 228 may be in contact with the circuit 224 while the other end of the electrical contact 228 may be at a distance D from the moveable end portion 214. The moveable end portion 214 may be aligned with the electrical contact 228 such that when the moveable end portion 214 deflects in direction A, the contact pad 222 contacts the electrical contact 228. The stationary end portion 212 may also be electrically coupled to the circuit 224, for example, via another electrical contact 226. The electrical contact 226 may be a pillar extending from the circuit 224 through an insulator, to the stationary end portion 212. The electrical contact 226 may be identical to the electrical contact 228. The electrical contacts 226 and 228, like the conductive spring 210, may be an electrical conductor and may include copper such as beryllium copper. The key switch mechanism 200 may further include a casing or an enclosure that encloses the dome 216. The casing may also at least partially or substantially enclose at least one of the electrical contact 228, the conductive spring 210 and the plunger 204. The enclosure may include a top cover 206 and a bottom cover 208. The top cover 206 and the bottom cover 208 may be matingly coupled together or adhered together, to form the casing.

The plunger 204 may be displaceable between a neutral position (as shown in FIG. 2) and an activation position. When an external force is exerted on the key button 202 in the direction A, for example, when a user presses on the key button 202, the plunger 204 may correspondingly displace in the direction A, from the neutral position to the activation position. In the activation position, the plunger 204 may compress the dome 216. As a result, the dome 216 may be elastically deformed to partially collapse. The moveable end portion 214 of the conductive spring 210 may be coupled to the dome 216 in a manner such that when the dome 216 collapses, the moveable end portion 214 may correspondingly move. The moveable end portion 214 may move by deflecting about the hinge portion 220. When the moveable end portion 214 moves in tandem with the partial collapse of the dome 216, the moveable end portion 214 or the contact pad 222 may contact the electrical contact 228. As a result, the circuit 224 may generate an electrical signal. The key switch mechanism 200 may transmit the generated electrical signal to a controller or a computing device. The activation position may be referred to as a halfway-travel position, as the key button 202 has only been displaced by about half of the total distance that it can be pressed down.

The plunger 204 may be further displaceable from the activation position to a bottom position. When the plunger 204 is in the bottom position, the moveable end portion 214 may still be contacting the electrical contact 228 and may be elastically deflected by the electrical contact 228. When the plunger 204 is in the bottom position, the dome 216 may be fully compressed or collapsed such that the plunger 204 cannot be displaced further in the direction A. The bottom position may be referred to as a full-travel position, as the key button 202 cannot be further pressed down once it has reached the bottom position. The key switch mechanism 200 may provide the user with a satisfying tactile feel due to the collapsing nature of the dome 216 that could not be replicated by a spring. The key switch mechanism 200 also achieves a fast response time, as the electrical signal is generated at halfway-travel, when the dome 216 is only partially collapsed. The plunger 204 may displace from the activation position to the bottom position if the user continues to depress the key button 202 after the plunger 204 has reached the activation position. It is not necessary for the user to depress the key button 202 to the bottom position to activate the switch, but the user may choose to do so as a matter of preference or habit.

When the user releases the downward force from the key button 202 when the plunger 204 is in either the activation position or the bottom position, the dome 216 may resume its original shape owing to the resiliency of the elastomer. In addition, the moveable end 214 of the contact spring 210 may also pivot about the hinge portion 220, in other words, the contact spring 210 may rebound from the deflected position. As a result of the dome 216 resuming its original shape and the rebound action of the contact spring 210, the plunger 204 may be correspondingly pushed back to the neutral position in direction C. The direction C may be opposite to direction A. The key button 202 may also be raised in position, due to the displacement of the plunger 204. The plunger 204 may be pushed back to the neutral position faster and with a stronger force than in a conventional dome switch, owing to the rebound force from the contact spring 214. The fast and strong push-back of the plunger 204 may provide a superior user experience.

Figure 3:
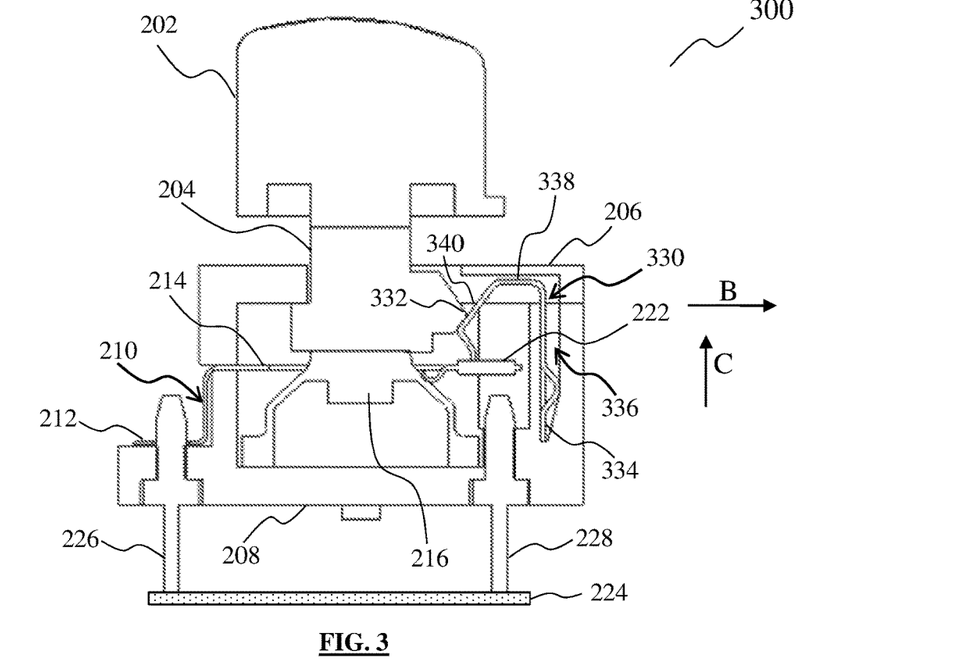
FIG. 3 shows a cross-sectional view of a key switch mechanism according to various embodiments.

FIG. 3 shows a cross-sectional view of a key switch mechanism 300 according to various embodiments. The key switch mechanism 300 may include the key switch mechanism 200. In addition, the key switch mechanism 300 may further include an actuation spring 330. The actuation spring 330 may be arranged adjacent to the plunger 204. The actuation spring 330 may be fabricated from a tensile, ductile material, for example a metal. The actuation spring 330 need not be an electrical conductor. The actuation spring 330 may be compressible in direction B which may be at least substantially perpendicular to direction A. The actuation spring 330 include a main body 334. The actuation spring 330 may also include a connecting portion 338 and an abutting portion 340. The main body 334 may be connected to a connecting portion 338. The connecting portion 338 may extend towards the plunger 204. The connecting portion 338 may bend obliquely and extend to an abutting portion 340. The abutting portion 340 may bend outward, i.e. towards the plunger 204. The abutting portion 340 may be kinked or bent. The abutting portion 340 may be deflected towards the main body 334 about the connection portion 338, when the actuation spring 330 is compressed in direction B. The main body 334 may be arranged in a sliding groove 336 of the bottom cover 208. The plunger 204 may include a protrusion 332. The protrusion 332 may be shaped to engage the abutting portion 340. When the plunger 204 displaces from the neutral position to the activation position, the protrusion 332 may push against the abutting portion 340, thereby compressing the actuation spring 330 in the direction B. When the actuation spring 330 is compressed, it may slide in the direction A along the sliding groove 336. When the plunger 204 displaces further downwards, for example just past the activation position or from the activation position to the bottom position, such that the protrusion 332 passes the kink in the abutting portion 340, the actuation spring 330 may rebound back into its original shape and in doing so, release stored energy in the actuation spring 330 to cause the actuation spring 330 to move upwards in direction C. When the actuation spring 330 moves upwards in direction C, it may impact an inner surface of the top cover 206, thereby producing a click sound. The click sound provides an audible feedback to a user, to indicate that the electrical signal is generated. The actuation spring 330 may be a leaf spring. When the actuation spring 330 moves upwards in direction C, the abutting portion 340 may push against the protrusion 332 of the plunger 204. As a result, the actuation spring 330 may exert an upward force on the plunger 204, which increases the speed with which the plunger 204 may return to the neutral position.

Figure 4:
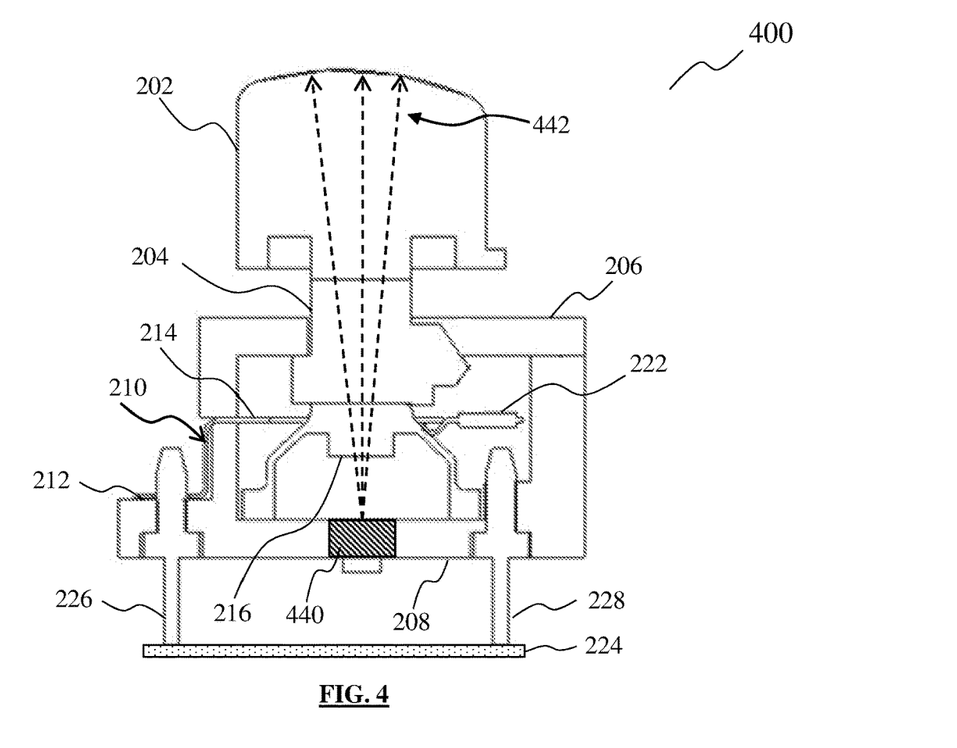
FIG. 4 shows a cross-sectional view of a key switch mechanism according to various embodiments.

FIG. 4 shows a cross-sectional view of a key switch mechanism 400 according to various embodiments. The key switch mechanism 400 may include the key switch mechanism 200, or the key switch mechanism 300. The key switch mechanism 400 may be at least substantially similar to the key switch mechanism 200 or the key switch mechanism 300. In the key switch mechanism 400, the key button 202 and the dome 216 may be at least partially light permeable. In other words, the key button 202 and the dome 216 may be transparent or translucent so that light can pass through the dome 216 and the key button 202. The plunger 204 may also be at least partially light permeable. Alternatively, or additionally, the plunger 204 may include a hollow space or a through hole, for light to pass through the plunger 204. In addition to the key mechanisms 200 or 300, the key switch mechanism 400 may further include a light emitter 440. The light emitter 440 may be arranged under the dome 216, for example, within the cavity defined by the dome 216, or embedded into the bottom cover 208 and aligned to be beneath the cavity defined by the dome 216. The light emitter 440 may be placed directly at the center of cavity defined by the dome. The light emitter 440 may be electrically coupled to the circuit 224. The light emitter 440 may receive electrical energy from the circuit 224 and may convert the electrical energy to visible light. The light emitter 440 may be at least substantially aligned with the hollow space of the plunger 204. When the light emitter 440 emits light 442, the light 442 may pass through the light permeable dome 216, enter the hollow space of the plunger 204 and then pass through the light permeable key button 202. As a result, the key button 202 may be lit up from within. The light emitter 440 may be configured to emit light when the moveable end portion 214 or the contact pad 222 contacts the electrical contact 228. For example, the light emitter 440 may be electrically coupled to the electrical contacts 226 and 228. Alternatively, the light emitter 440 may be configured to always emit light so long as the key switch mechanism is provided with electrical power. Yet alternatively, the light emitter 440 may be electrically coupled to another circuit and may be operated by a controller to emit light according to other conditions, for example manual selection by the user or an event in an application running on a computing device. The light emitter 440 may also be configured to change its lighting color, sequence or intensity, based on control signals received from the controller. The light emitter 440 may be a light emitting diode (LED).

Figure 5:
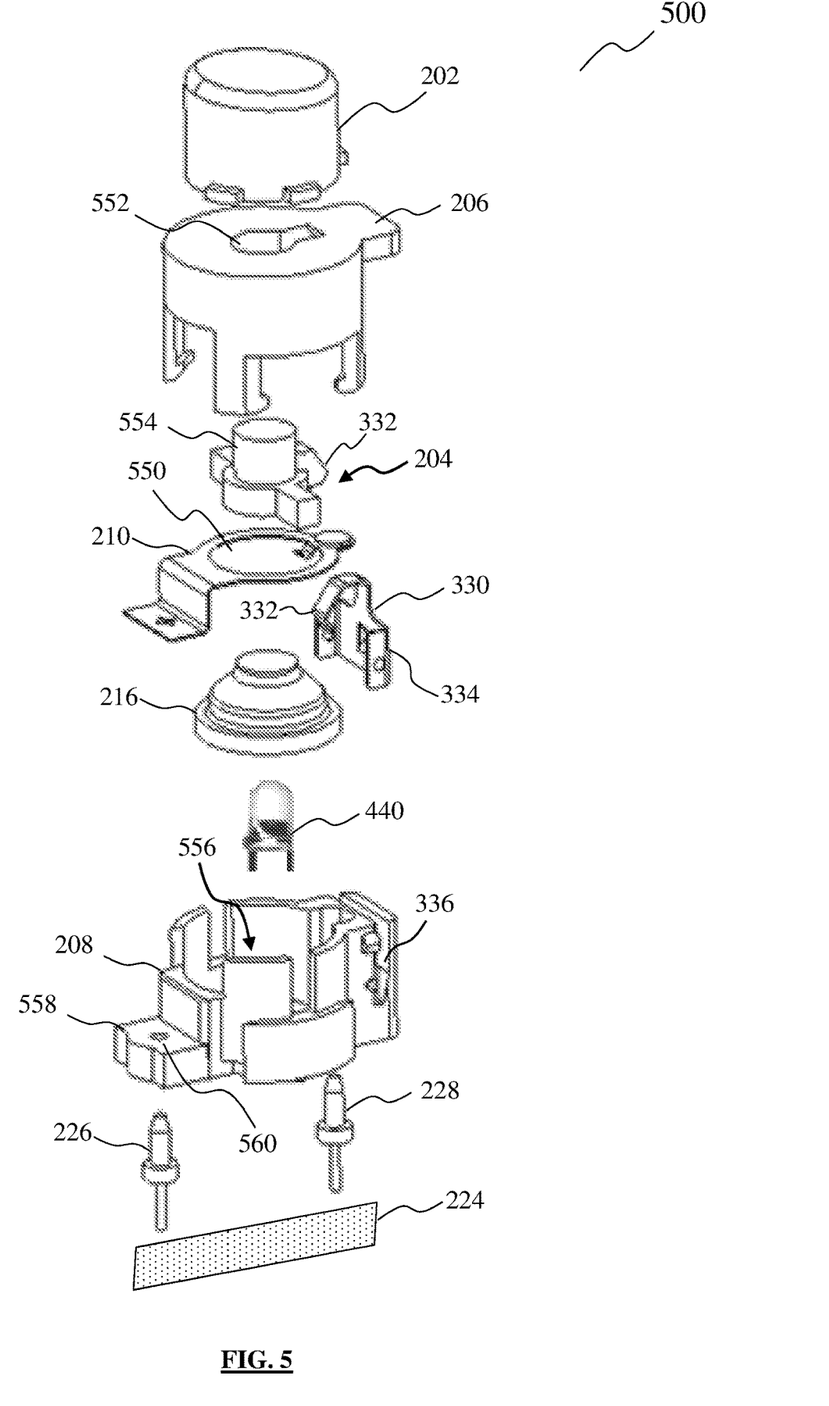
FIG. 5 shows an exploded view of a key switch mechanism according to various embodiments.

FIG. 5 shows an exploded view 500 of a key switch mechanism according to various embodiments, such as any one of the key switch mechanisms 200, 300 or 400. The actuation spring 330 and the light emitter 440 may be optional elements in the key switch mechanism. The exploded view 500 shows an example of the arrangement of the components of the key switch mechanism. The key button 202 may be arranged over the top cover 206. The top cover 206 may be arranged over the plunger 204. The top cover 206 may include a through hole 552 for receiving part of the plunger 204. The plunger 204 may include a shaft 554 that may be received in the through hole 552. The plunger 204 may be coupled to the key button 202 via the shaft 554.

The conductive spring 210 may be arranged under the plunger 204. The conductive spring 210 may include a through hole 550 in its moveable end portion 214 for receiving part of the dome 216. The through hole 550 may at least partially fit over and around the dome 216 so as to couple the moveable end portion 214 to the dome 216. The conductive spring 210 may be provided between the plunger 204 and the dome 216. The bottom cover 208 may be arranged under and around the dome 216. The dome 216 may be provided between the plunger 204 and the bottom cover 208. The bottom cover 208 may include a cavity 556 into which the dome 216 may be positioned. The bottom cover 208 may be coupleable with the top cover 206, or the top cover 206 may be fitted over the bottom cover 208, to form a casing enclosing at least the dome 216 and the moveable end portion of the conductive spring 210. The bottom cover 208 may include bores 560 extending through a base flange 558. The electrical contact 226 may be inserted through a first bore 560 to contact the stationary end portion of the conductive spring 210. The electrical contact 228 may be inserted through a second bore 506 to be at a short distance away from the moveable end portion 214 of the conductive spring 210. The base flange 558, or the entire bottom cover 208, may be made of an electrically insulating material, to electrically insulate the conductive spring 210 from the circuit 224. The key switch mechanism may further include the actuating spring 330. The actuating spring 330 may be partially received in the sliding groove 336 of the bottom cover 208. The main body 334 may be slidably positioned in the sliding groove 336. The abutting portion 340 of the actuating spring 330 may extend into the cavity 556. The key switch mechanism may further include the light emitter 440. The light emitter 440 may be arranged between the dome 216 and the bottom cover 208. The light emitter 440 may be enclosed by the dome 216.

Figure 6:
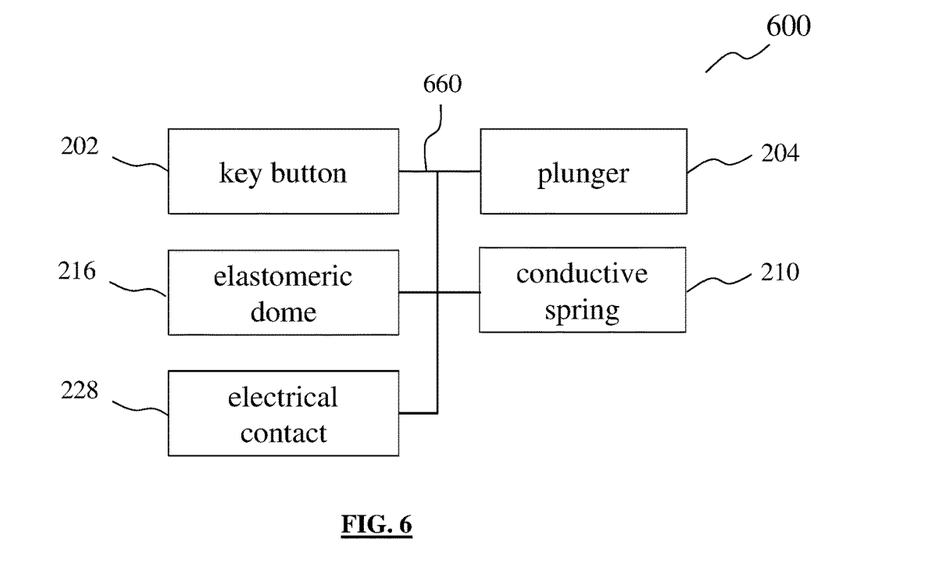
FIG. 6 shows a conceptual diagram of a key switch mechanism according to various embodiments.

FIG. 6 shows a conceptual diagram of a key switch mechanism 600 according to various embodiments. The key switch mechanism 600 may be part of, or may include any one of the key switch mechanisms 200, 300 or 400. The key switch mechanism 600 may include a key button 202, a plunger 204, an elastomeric dome 216, a conductive spring 210 and an electrical contact 228. The plunger 204 may be attached to the key button 202 and displaceable between a neutral position and an activation position. The elastomeric dome 216 may be non-deformed when the plunger 204 is in the neutral position, and may be elastically deformed by the plunger 204 when the plunger 204 is in the activation position. The conductive spring 210 may have a stationary end portion and a moveable end portion. The stationary end portion may be electrically coupled to a circuit, and the moveable end portion may be coupled to the elastomeric dome 216 in a manner to be moved when the plunger 204 is displaced towards the activation position in connection with the corresponding deformation of the elastomeric dome 216. The electrical contact 228 may be electrically coupled to the circuit. When the plunger 204 is in the neutral position, the electrical contact 228 may be arranged at a distance from the moveable end portion. When the plunger 204 is in the activation position, the moveable end portion may be moved to contact the electrical contact 228. The key button 202, the plunger 204, the elastomeric dome 216, the conductive spring 210 and the electrical contact 228 may be coupled with each other, like indicated by lines 660, for example mechanically coupled, and/or electrically coupled.

In other words, according to various embodiments, the key switch mechanism 600 may include a key button 202 that is attached to a plunger 204. The plunger 204 may be moved between a neutral position and an activation position. The plunger 204 may move from the neutral position to the activation position when an external force is exerted on the key button 202. The key switch mechanism 600 may also include an elastomeric dome 216. When the plunger 204 is in the neutral position, the elastomeric dome 216 may be non-deformed. When the plunger 204 is in the activation position, the plunger 204 may elastically deform the elastomeric dome 216. The conductive spring 210 may be a cantilever spring. The conductive spring 210 may include copper or beryllium copper. The conductive spring 210 may have a stationary end portion 212 opposing a moveable end portion 214. The stationary end portion 212 may be in electrical contact with a circuit. The moveable end portion 214 may be at a distance from the electrical contact 228 which may be in electrical contact with the circuit. The electrical contact 228 may be external to the elastomeric dome 216. The moveable end portion 212 may be coupled to the elastomeric dome 216 such that when the elastomeric dome 216 deforms in connection with the displacement of the plunger 204 towards the activation position, the moveable end portion 212 moves correspondingly. The moveable end portion 214 may include a through hole at least partially fitting over and around the elastomeric dome 216 to couple the moveable end portion 214 to the elastomeric dome 216. When the plunger 204 is in the activation position, the moveable end portion may be moved to contact the electrical contact 228. The plunger 204 may be further displaceable from the activation position to a bottom position in which the moveable end portion 214 may still contact the electrical contact 228 and may be elastically deflected by the electrical contact 228. When the plunger 204 is in the bottom position, the elastomeric dome 216 may be fully compressed or collapsed.

Figure 7:
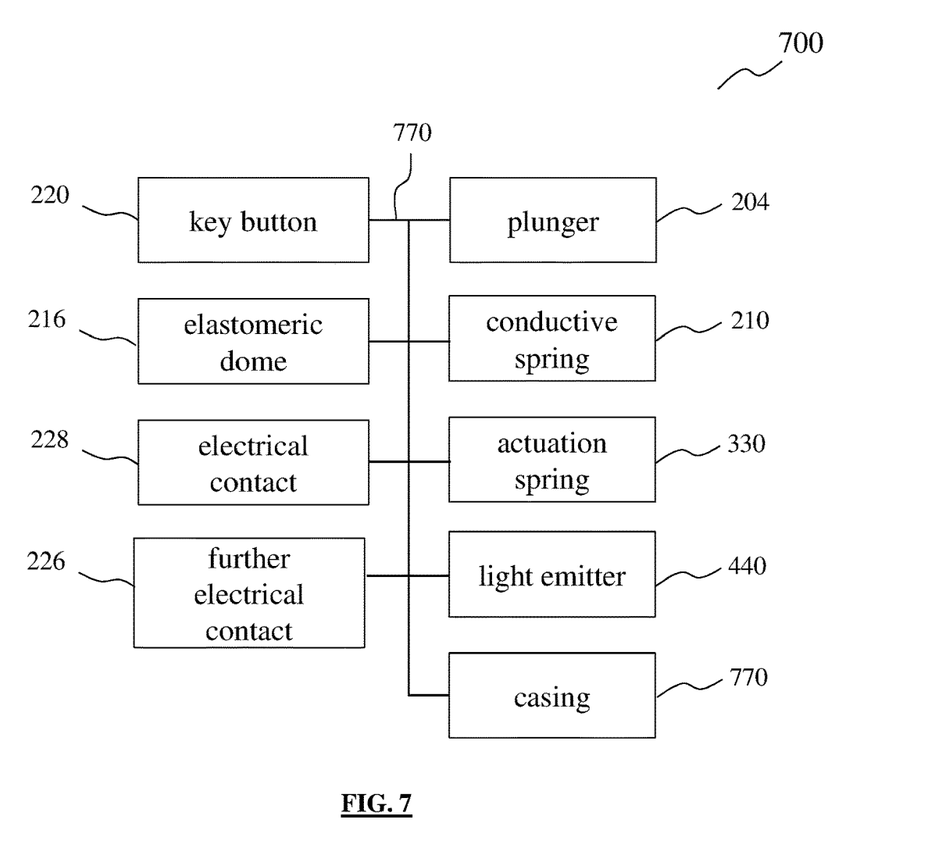
FIG. 7 shows a conceptual diagram of a key switch mechanism according to various embodiments.

FIG. 7 shows a conceptual diagram of a key switch mechanism 700 according to various embodiments. The key switch mechanism 700 may be part of, or may include any one of the key switch mechanisms 200, 300, 400 or 600. In addition to the key switch mechanism 600, the key switch mechanism 700 may further include a further electrical contact 226, an actuation spring 330, a light emitter 440 and a casing 770. The further electrical contact 226 may be external to the elastomeric dome 216 and may connect the circuit to the stationary end portion 212. The actuation spring 330 may be arranged adjacent to the plunger 204. The actuation spring 330 may be compressible in a first direction. The first direction may be at least substantially perpendicular to a second direction of the displacement of the plunger 204 between the neutral position and the activation position. The light emitter 440 may be arranged under the elastomeric dome 216, or in other words, enclosed by the elastomeric dome 216. The elastomeric dome 216 may be at least partially light permeable such that light emitted by the light emitter 440 may be visible from outside of the elastomeric dome 216. The plunger 204 may also include a hollow space at least substantially aligned with the light emitter 440 so that the light emitted by the light emitter 440 may be visible from an opening of the plunger 204. The key button 202 may also be at least partially light permeable so that the light emitted by the light emitter 440 may be visible from outside of the key button 202. The key button 202, the plunger 204, the elastomeric dome 216, the conductive spring 210, the electrical contact 228, the further electrical contact 226, the actuation spring 330, the light emitter 440 and the casing 770 may be coupled with each other, like indicated by lines 770, for example mechanically coupled, and/or electrically coupled.

Figure 8:
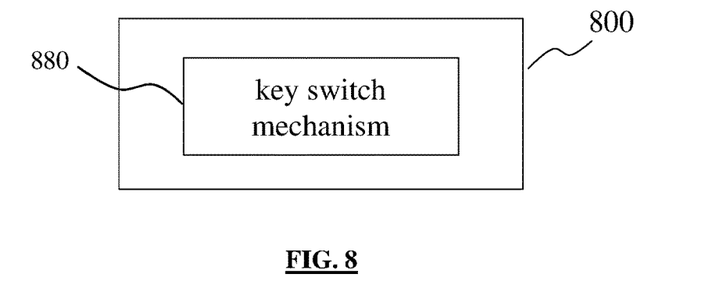
FIG. 8 shows a conceptual diagram of a user input device according to various embodiments.

FIG. 8 shows a conceptual diagram of a user input device 800 according to various embodiments. The user input device 800 may be a game controller like the user input device 100. The user input device 800 may also be any one of a keyboard, a mouse or a joystick. The user input device 800 may include a key switch mechanism 880. The key switch mechanism 880 may be part of, or may include any one of the key switch mechanisms 200, 300, 400, 600 or 700.

Figure 9:
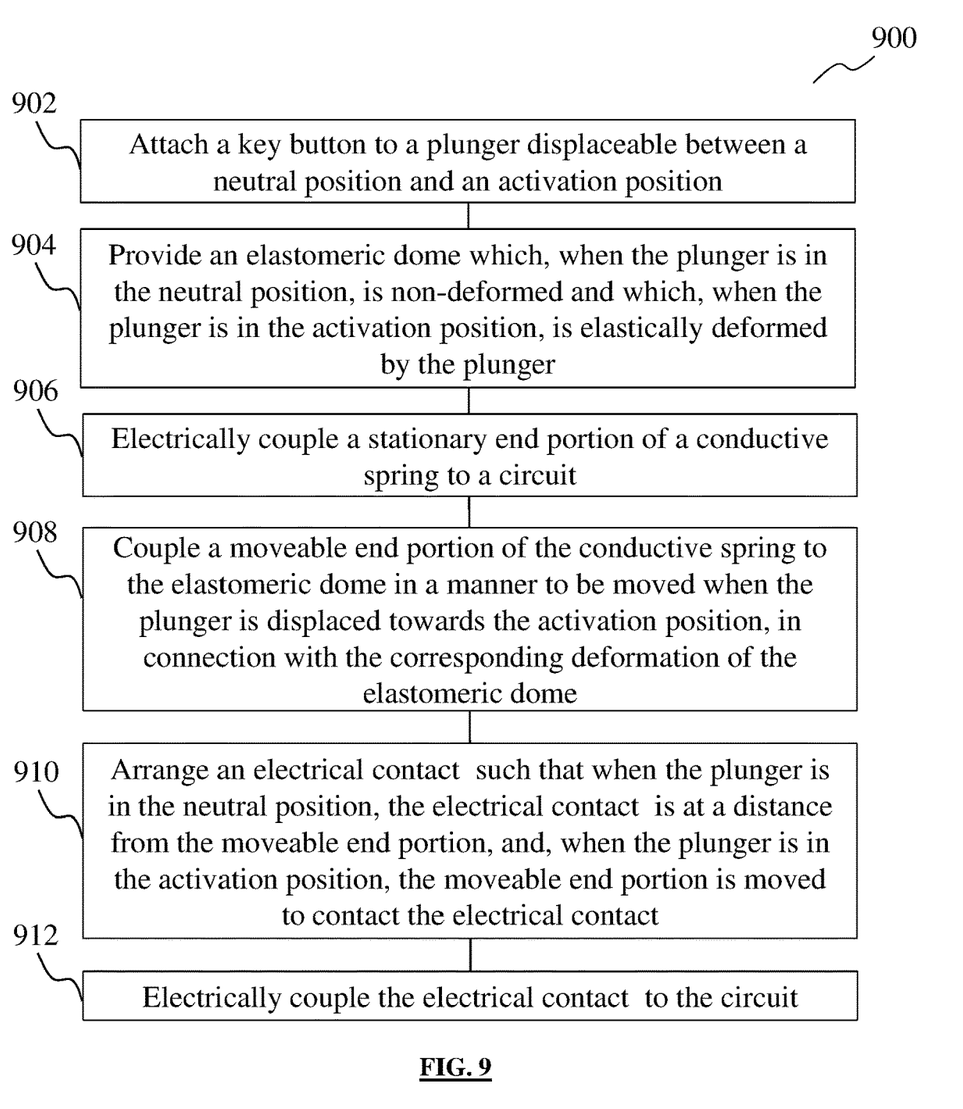
FIG. 9 shows a flow diagram of a method for fabricating a key switch mechanism according to various embodiments.

FIG. 9 shows a flow diagram 900 of a method for fabricating a key switch mechanism according to various embodiments. The method may include processes 902, 904, 906, 908, 910 and 912. Process 902 may include attaching a key button to a plunger displaceable between a neutral position and an activation position. Process 904 may include providing an elastomeric dome which, when the plunger is in the neutral position, is non-deformed and which, when the plunger is in the activation position, is elastically deformed by the plunger. Process 906 may include electrically coupling a stationary end portion of a conductive spring to a circuit. Process 908 may include coupling a moveable end portion of the conductive spring to the elastomeric dome in a manner to be moved when the plunger is displaced towards the activation position, in connection with the corresponding deformation of the elastomeric dome. Process 910 may include arranging an electrical contact such that when the plunger is in the neutral position, the electrical contact is at a distance from the moveable end portion, and, when the plunger is in the activation position, the moveable end portion is moved to contact the electrical contact. Process 912 may include electrically coupling the electrical contact to the circuit.

The following examples pertain to further embodiments.

Example 1 is a key switch mechanism including: a key button; a plunger attached to the key button and displaceable between a neutral position and an activation position; an elastomeric dome which, when the plunger is in the neutral position, is non-deformed and which, when the plunger is in the activation position, is elastically deformed by the plunger; a conductive spring having a stationary end portion and a moveable end portion, the stationary end portion electrically coupled to a circuit, and the moveable end portion coupled to the elastomeric dome in a manner to be moved when the plunger is displaced towards the activation position, in connection with the corresponding deformation of the elastomeric dome; and an electrical contact electrically coupled to the circuit, wherein, when the plunger is in the neutral position, the electrical contact is arranged at a distance from the moveable end portion, and, when the plunger is in the activation position, the moveable end portion is moved to contact the electrical contact.

In example 2, the subject-matter of example 1 can optionally include that the electrical contact is external to the elastomeric dome.

In example 3, the subject-matter of example 1 or example 2 can optionally include a further electrical contact external to the elastomeric dome, the further electrical contact connecting the circuit to the stationary end portion.

In example 4, the subject-matter of any one of examples 1 to 3 can optionally include an actuation spring arranged adjacent to the plunger, the actuation spring compressible in a first direction at least substantially perpendicular to a second direction of the displacement of the plunger between the neutral position and the activation position.

In example 5, the subject-matter of any one of example 1 to 4 can optionally include that the plunger is further displaceable from the activation position to a bottom position, in which the moveable end portion still contacts the electrical contact and is elastically deflected by the electrical contact.

In example 6, the subject-matter of example 5 can optionally include that when the plunger is in the bottom position, the elastomeric dome is fully compressed.

In example 7, the subject-matter of any one of examples 1 to 6 can optionally include the moveable end portion includes a through hole, the through hole at least partially fitting over and around the elastomeric dome to couple the moveable end portion to the elastomeric dome.

In example 8, the subject-matter of any one of examples 1 to 7 can optionally include that the conductive spring includes copper.

In example 9, the subject-matter of any one of examples 1 to 8 can optionally include that the elastomeric dome is at least partially light permeable.

In example 10, the subject-matter of any one of examples 1 to 9 can optionally include a light emitter arranged under the elastomeric dome.

In example 11, the subject-matter of example 10 can optionally include that the plunger includes a hollow space, the hollow space being at least substantially aligned with the light emitter.

In example 12, the subject-matter of any one of examples 1 to 11 can optionally include that the key button is at least partially light permeable.

In example 13, the subject-matter of any one of examples 1 to 12 can optionally include a casing enclosing the elastomeric dome and the moveable end portion of the conductive spring.

Example 14 is a user input device including: the key switch mechanism of any one of examples 1 to 13.

In example 15, the subject-matter of example 14 can optionally include that the user input device is one of a game controller or a keyboard.

Example 16 is a method of fabricating a key switch mechanism, the method including: attaching a key button to a plunger displaceable between a neutral position and an activation position; providing an elastomeric dome which, when the plunger is in the neutral position, is non-deformed and which, when the plunger is in the activation position, is elastically deformed by the plunger; electrically coupling a stationary end portion of a conductive spring to a circuit; coupling a moveable end portion of the conductive spring to the elastomeric dome in a manner to be moved when the plunger is displaced towards the activation position, in connection with the corresponding deformation of the elastomeric dome; arranging an electrical contact such that when the plunger is in the neutral position, the electrical contact is at a distance from the moveable end portion, and, when the plunger is in the activation position, the moveable end portion is moved to contact the electrical contact; and electrically coupling the electrical contact to the circuit.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A key switch mechanism comprising:
   a key button;
   a plunger attached to the key button and displaceable between a neutral position and an activation position;
   an elastomeric dome which, when the plunger is in the neutral position, is non-deformed and which, when the plunger is in the activation position, is elastically deformed by the plunger;
   a conductive spring having a stationary end portion and a moveable end portion, the stationary end portion electrically coupled to a circuit, and the moveable end portion coupled to the elastomeric dome in a manner to be moved when the plunger is displaced towards the activation position, in connection with the corresponding deformation of the elastomeric dome, wherein the moveable end portion comprises a through hole, the through hole at least partially fitting over and around the elastomeric dome to couple the moveable end portion to the elastomeric dome; and
   an electrical contact electrically coupled to the circuit, wherein, when the plunger is in the neutral position, the electrical contact is arranged at a distance from the moveable end portion, and, when the plunger is in the activation position, the moveable end portion is moved to contact the electrical contact.

2. The key switch mechanism of claim 1, wherein the electrical contact is external to the elastomeric dome.

3. The key switch mechanism of claim 1, further comprising:
   a further electrical contact external to the elastomeric dome, the further electrical contact connecting the circuit to the stationary end portion.

4. The key switch mechanism of claim 1, further comprising:
   an actuation spring arranged adjacent to the plunger, the actuation spring compressible in a first direction at least substantially perpendicular to a second direction of the displacement of the plunger between the neutral position and the activation position.

5. The key switch mechanism of claim 1, wherein the plunger is further displaceable from the activation position to a bottom position, in which the moveable end portion still contacts the electrical contact and is elastically deflected by the electrical contact.

6. The key switch mechanism of claim 5, wherein when the plunger is in the bottom position, the elastomeric dome is fully compressed.

7. The key switch mechanism of claim 1, wherein the conductive spring comprises copper.

8. The key switch mechanism of claim 1, wherein the elastomeric dome is at least partially light permeable.

9. The key switch mechanism of claim 1, further comprising:
   a light emitter arranged under the elastomeric dome.

10. The key switch mechanism of claim 9, wherein the plunger comprises a hollow space, the hollow space being at least substantially aligned with the light emitter.

11. The key switch mechanism of claim 1, wherein the key button is at least partially light permeable.

12. The key switch mechanism of claim 1, further comprising:
   a casing enclosing the elastomeric dome and the moveable end portion of the conductive spring.

13. A user input device comprising:
   the key switch mechanism of claim 1.

14. The user input device of claim 13, being one of a game controller or a keyboard.

15. A method of fabricating a key switch mechanism, the method comprising:
   attaching a key button to a plunger displaceable between a neutral position and an activation position;
   providing an elastomeric dome which, when the plunger is in the neutral position, is non-deformed and which, when the plunger is in the activation position, is elastically deformed by the plunger;
   electrically coupling a stationary end portion of a conductive spring to a circuit;
   coupling a moveable end portion of the conductive spring to the elastomeric dome in a manner to be moved when the plunger is displaced towards the activation position, in connection with the corresponding deformation of the elastomeric dome, wherein the moveable end portion comprises a through hole, the through hole at least partially fitting over and around the elastomeric dome to couple the moveable end portion to the elastomeric dome;
   arranging an electrical contact such that when the plunger is in the neutral position, the electrical contact is at a distance from the moveable end portion, and, when the plunger is in the activation position, the moveable end portion is moved to contact the electrical contact; and electrically coupling the electrical contact to the circuit.

\* \* \* \* \*